(12) United States Patent
Gummadidala et al.

(10) Patent No.: US 10,826,724 B2
(45) Date of Patent: Nov. 3, 2020

(54) FLEXIBLE UNNUMBERED DESTINATION TUNNELS FOR VIRTUAL NETWORKS

(71) Applicant: Microsoft Technology Licensing, LLC, Redmond, WA (US)

(72) Inventors: Kishore Gummadidala, Fremont, CA (US); Pankaj Shukla, San Jose, CA (US); Pankaj Garg, Union City, CA (US); Ramakanth Gunuganti, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 16/141,646

(22) Filed: Sep. 25, 2018

(65) Prior Publication Data

US 2020/0099549 A1 Mar. 26, 2020

(51) Int. Cl.
*H04L 12/46* (2006.01)
*H04L 12/741* (2013.01)

(52) U.S. Cl.
CPC ........ *H04L 12/4633* (2013.01); *H04L 45/745* (2013.01)

(58) Field of Classification Search
CPC .......................... H04L 45/745; H04L 12/4633
See application file for complete search history.

(56) References Cited

U.S. PATENT DOCUMENTS

2012/0163388 A1  6/2012  Goel et al.
2013/0283364 A1  10/2013 Chang et al.
2015/0172075 A1  6/2015  Decusatis et al.
2016/0028624 A1  1/2016  Song et al.
2016/0285736 A1  9/2016  Gu
2017/0289068 A1* 10/2017 Palermo .............. H04L 49/9047
2018/0007123 A1  1/2018  Cheng et al.
2018/0225230 A1* 8/2018  Litichever ........... G06F 9/45504
2018/0309718 A1* 10/2018 Zuo ..................... H04L 12/4641

FOREIGN PATENT DOCUMENTS

WO       2015181664 A1    12/2015

OTHER PUBLICATIONS

"International Search Report and Written Opinion Issued in PCT Application No. PCT/US19/039116", dated Jan. 2, 2020, 17 Pages.

* cited by examiner

*Primary Examiner* — Gbemileke J Onamuti
(74) *Attorney, Agent, or Firm* — Mark K. Young; Mayer & Williams, PC

(57) ABSTRACT

A cloud service provider's enterprise edge device and network interface are configured to establish a single tunnel connection with a remote server for delivering data packets to multiple distinct virtual machines on the remote server. The provider's enterprise edge device stores the network address information for each virtual machine and remote server to attach the destination network addresses to the data packet for transmission to the appropriate virtual machine on the remote server. Utilizing a single tunnel to transmit data packets to multiple virtual machines increases scalability at the provider's enterprise edge device and reduces system resources compared to other implementations in which the provider uses a tunnel for each virtual machine on a remote server.

20 Claims, 18 Drawing Sheets

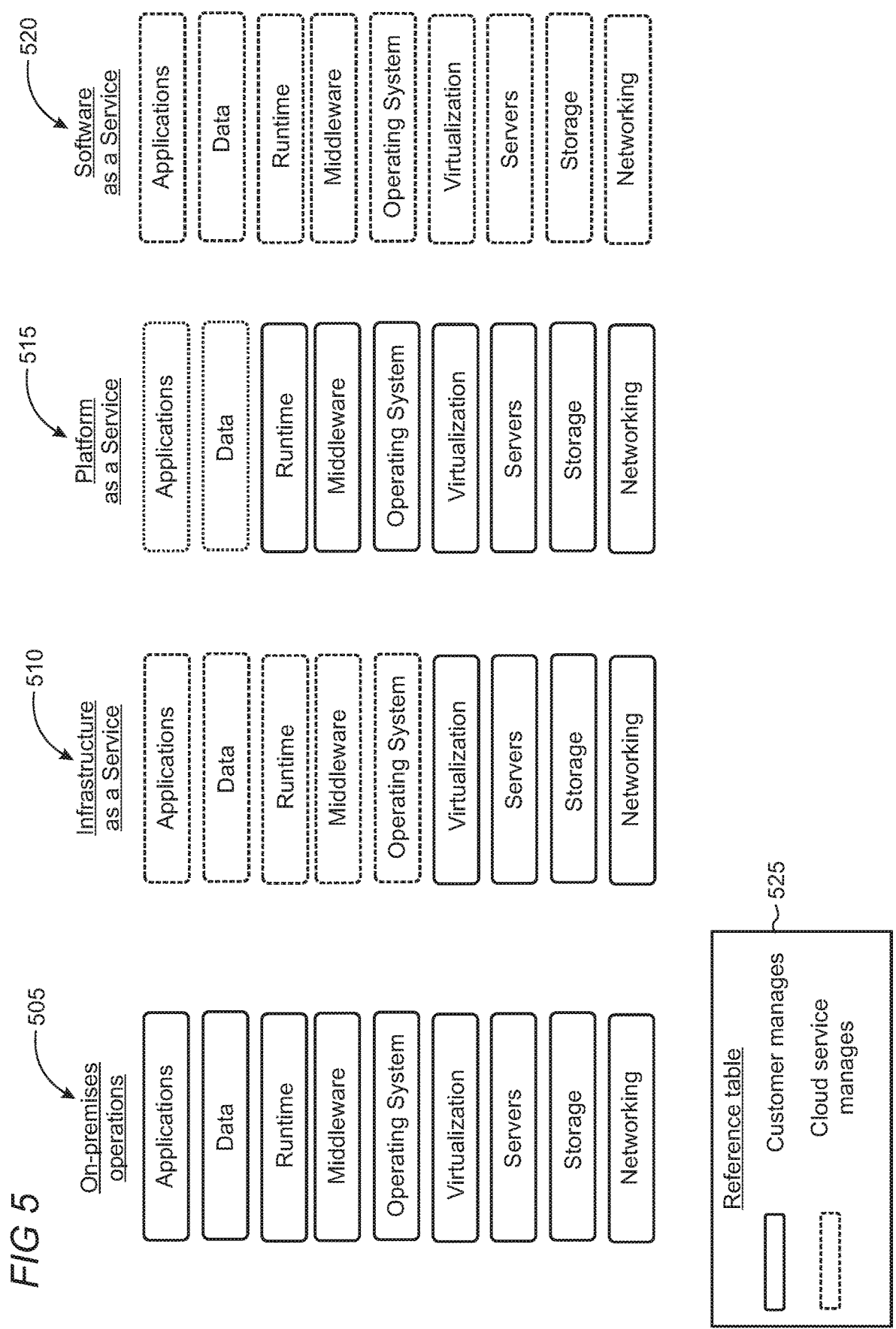

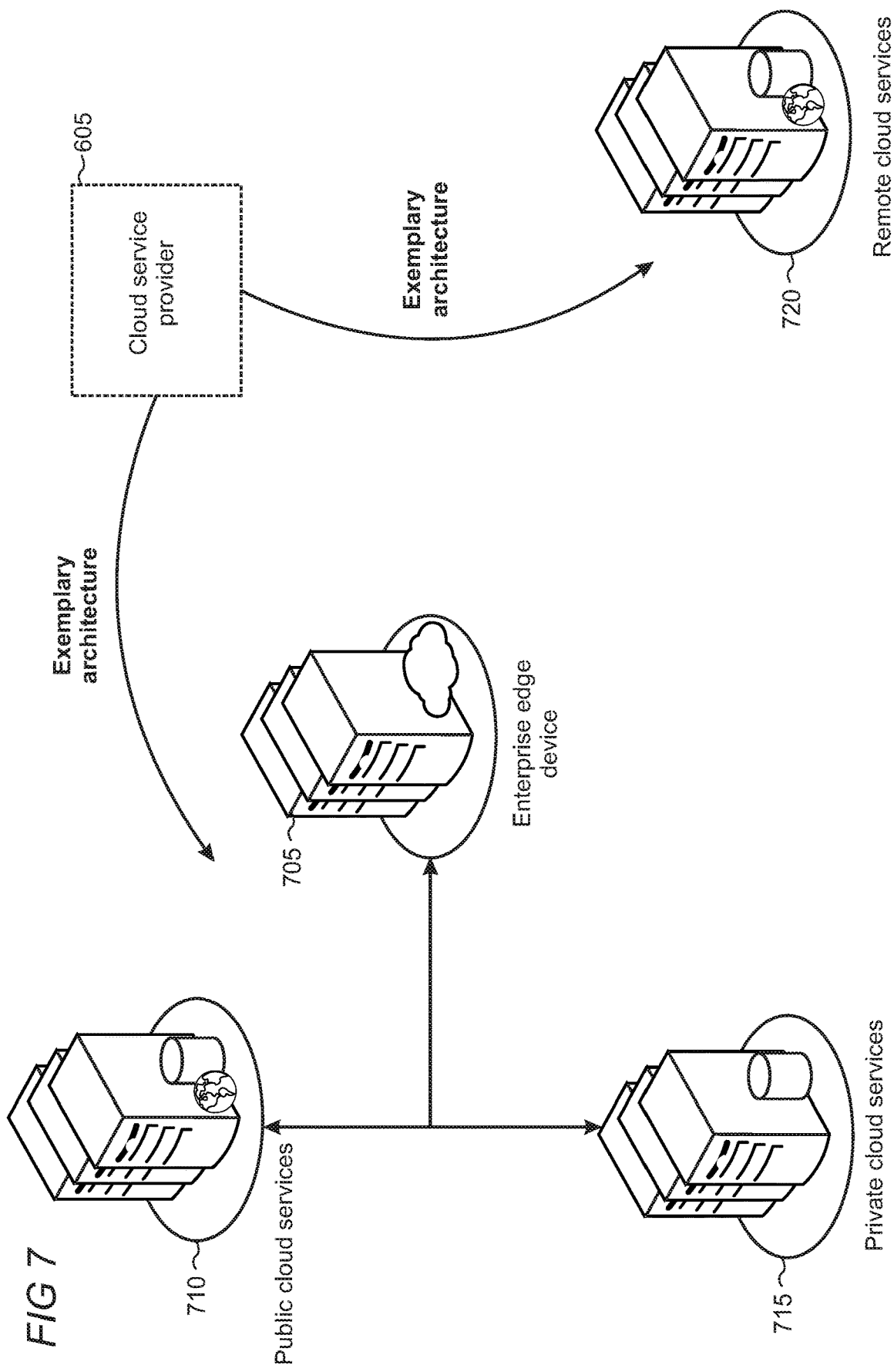

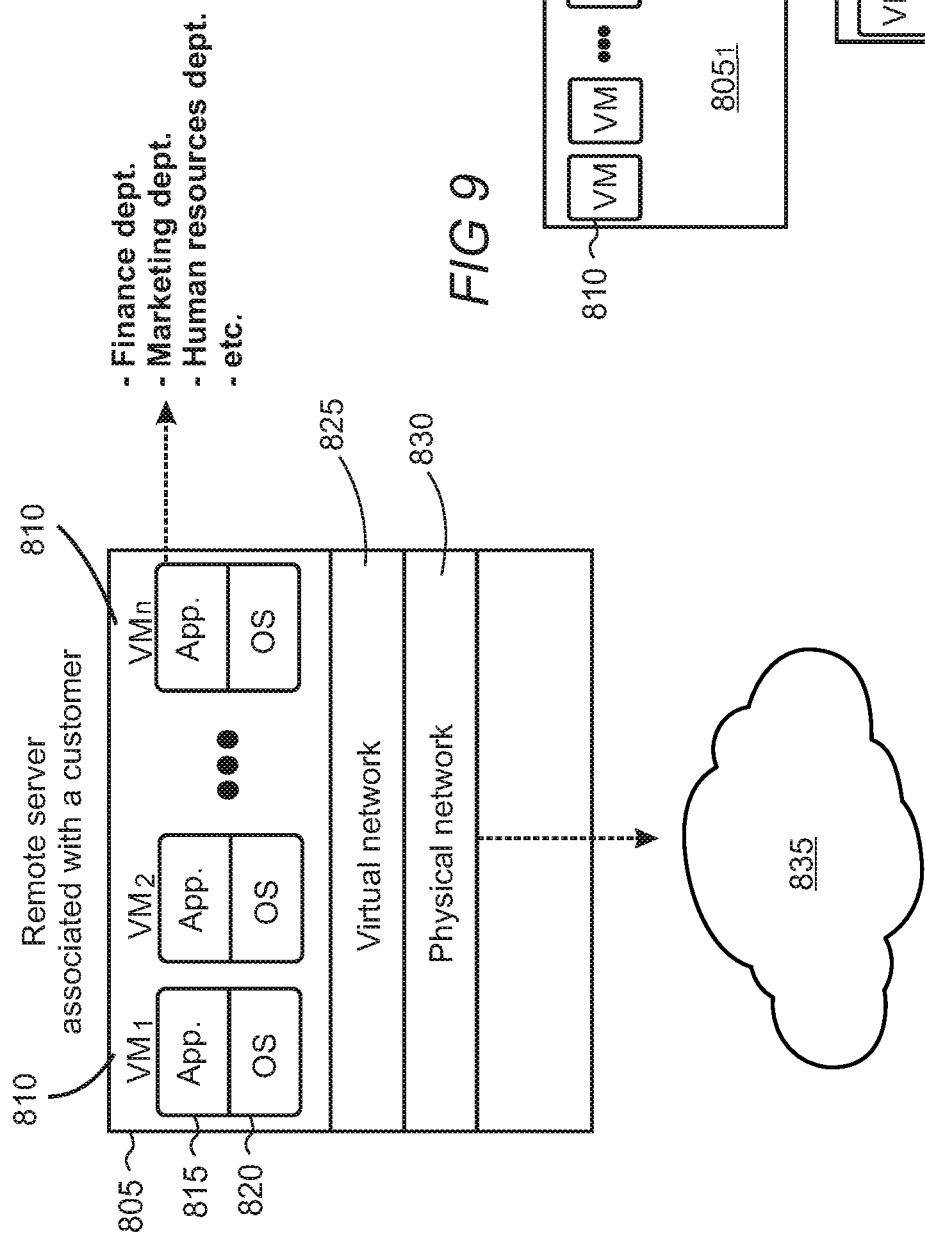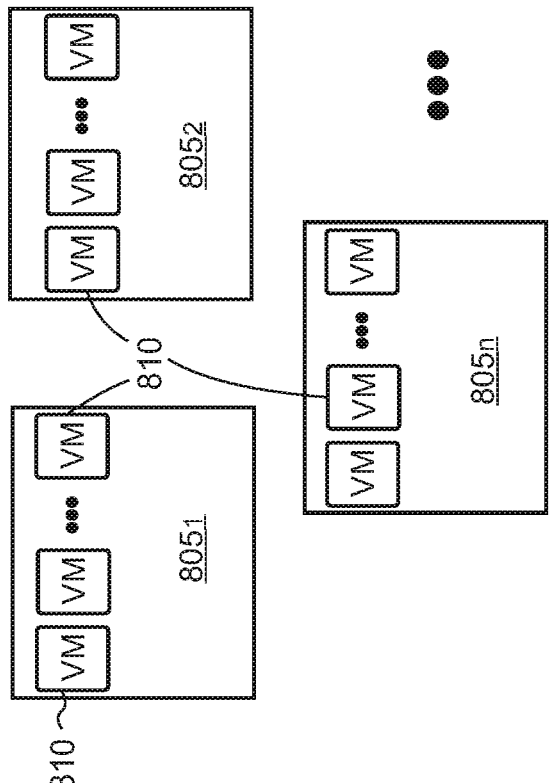

1600

1700

FLEXIBLE UNNUMBERED DESTINATION TUNNELS FOR VIRTUAL NETWORKS

BACKGROUND

A cloud service provider can implement enterprise edge devices which interoperate with remote servers that employ virtual machines for various purposes for customers such as computing, data storage, management of IoT (Internet of Things), and the like. The remote servers and associated virtual machines may, for example, be operated remotely by a customer as a single entity or organization. Directly connecting the enterprise edge device to the remote servers using a tunnel can provide a fast and secure method for communicating, e.g., exchanging data for use by a customer. Using a private connection, the edge device's traffic is tunneled to the cloud virtual networks. These tunnels can be terminated at a gateway and/or at the virtual machine.

The use of tunnels can pose scalability challenges because a customer's virtual network can span across multiple nodes in the physical underlay network. While a gateway positioned between the provider's enterprise edge device and remote server can alternatively be used to direct data packets, the gateway can become a single point of failure and may impose a bottleneck on transmission bandwidth and network performance.

SUMMARY

Flexible unnumbered destination tunnels are implemented in a cloud service provider's enterprise edge networking device that is configured to anchor multiple destinations of virtual machines in a remote server to a single tunnel object to thereby improve virtual network scalability and performance. These tunnels provide connectivity to virtual machines in the cloud without requiring a gateway.

An actual destination IP (Internet Protocol) address is computed using a virtual-to-physical IP address lookup during packet forwarding so that the provider's enterprise edge device knows the network addresses of the remote servers associated with a given customer so that data packets can be routed to the appropriate destination. For example, the provider's enterprise edge device knows the IP addresses of the virtual machines and the physical network address for the remote server which houses the respective virtual machines. When preparing to transmit data packets to a specific virtual machine on the remote server, the provider's enterprise edge networking device attaches the network address information to the data packet for the destination virtual machine which is used by an overlay network to tunnel the packets.

In an illustrative implementation, a gateway may be utilized to transmit data packets between the provider's enterprise edge device and the remote server. Thus, either the gateway or the single tunnel connection can be selectively utilized to handle data packets based on a given use scenario or customer requirement. One or more of the provider's enterprise edge devices may be configured with knowledge of the network address information for remote servers to establish the single tunnel connection and communicate with the virtual machines. Each of the remote servers associated with a customer may thereby respectively utilize an unnumbered tunnel destination on the single tunnel interface to the provider's enterprise edge device.

Scalability and performance of the customer's virtual network operating in the cloud is improved by utilization of a single tunnel to transmit data packets from the provider's enterprise edge device to multiple virtual machines on a remote server. In conventional tunnel architecture, a provider's enterprise edge device may have employed one tunnel per node (e.g., virtual machine) in the underlay network. The present flexible unnumbered destination tunnel arrangement enables utilization of a single tunnel interface to deliver data packets to multiple destination virtual machines instantiated on the remote server. System resources such as memory, processor usage, and network interface can thereby be more efficiently utilized which can improve overall network performance. In addition, the provider's enterprise edge device can flexibly establish unnumbered destination tunnels as needed to communicate with respective virtual machines on remote servers and also across remote servers. Such flexibility enables a network to be scaled according to capabilities of the edge computing device rather than be limited by tunnel scalability.

The utilization of a single tunnel can decrease latency between the provider and customer. The use of a gateway to transmit data packets to the remote server typically increases the number of hops (i.e., the number of devices encountered by the data packet) between the data packets origin and destination. Reducing the number of hops can reduce the amount of processing per packet and thereby reduce latency. In addition, by providing an alternative to conventional tunnel architecture in which all packets are tunneled to a gateway, the single tunnel reduces the risk and rate at which the gateway becomes a single point-of-failure in data transmission due to hardware or software issues local to the gateway device. Additionally, using a single tunnel interface can consolidate data for various networking features, such as policing, firewalls, counters, etc., into a single object to facilitate data collection at one location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 5 shows an illustrative diagram of management services provided by the cloud service provider depending on a customer's setup;

FIG. 7 shows illustrative architectures of the cloud service provider's setup;

FIG. 8 shows an illustrative system architecture for virtual machines instantiated on a provider's remote servers, which are associated with, and publicly or privately usable by, a customer;

FIG. 9 shows an illustrative environment of multiple remote servers associated with and usable by a customer;

Like reference numerals indicate like elements in the drawings. Elements are not drawn to scale unless otherwise indicated.

DETAILED DESCRIPTION

Figure 1:
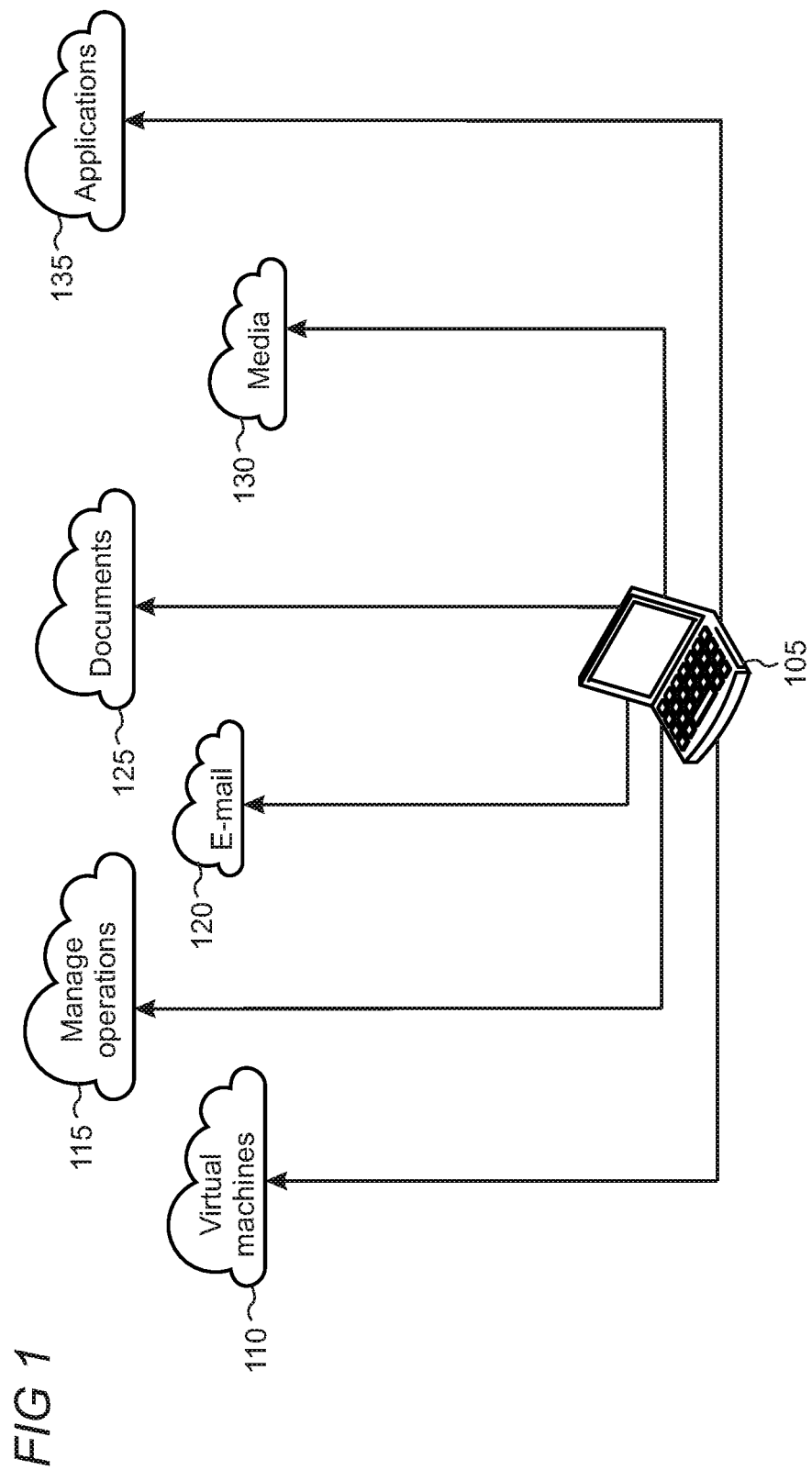
FIG. 1 shows an illustrative environment of a client computing device accessing and using various cloud services for personal or professional tasks.

FIG. 1 shows an illustrative environment in which a local client computing device 105 is configured to utilize various services offered by a cloud service provider. A user of the client device may elect to leverage the benefits offered by cloud service providers. Benefits can include flexibility in bandwidth, data backup and recovery, flexible access with an Internet connection, among other benefits. The clouds for each artifact in FIG. 1 depict the deployment of cloud computing network connections to access the various artifacts, which can include a combination of personal area networks (PANs), local area networks (LANs), wide area networks (WANs), the Internet, and the world wide web (individually or collectively a network).

As shown in FIG. 1, the user may store data and access various resources exposed by cloud computing services. For example, the user can use virtual machines 110 operating on remote servers; manage operations 115 such as for IoT (Internet of Things) or applications; store and access e-mail 120; store and access documents 125 in varying formats such as Microsoft Word® and PDF (Adobe Portable Document Format®); store and access media 130 such as music and videos of varying formats including MP3 (Motion Picture Experts Group Layer 3), MP4 (Moving Pictures Expert Group 4), and AVI (Audio Video Interleave); and store, create, or use applications 135 (proprietary or third-party).

Figure 2:
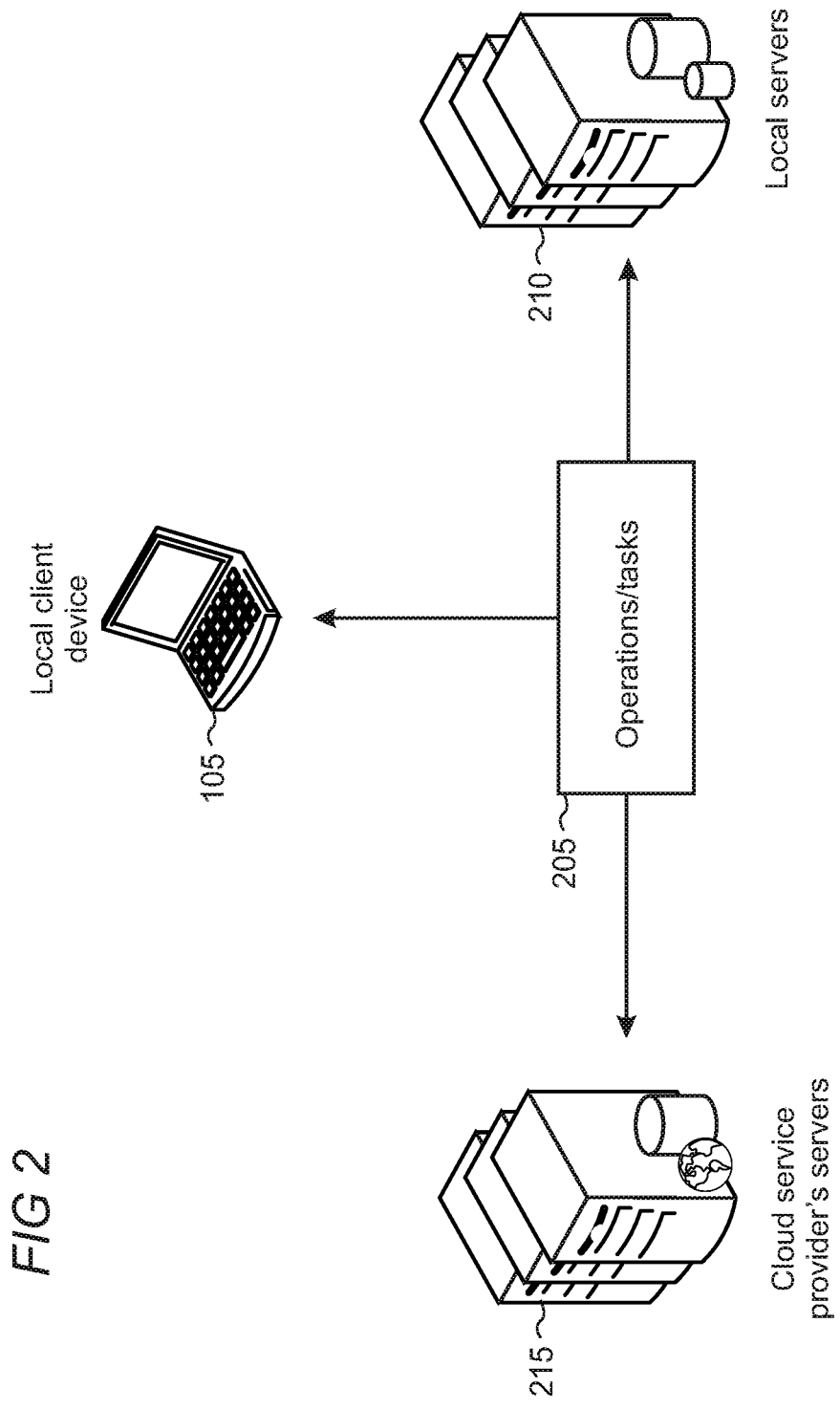
FIG. 2 shows an illustrative diagram in which an operation or task is performable by a client's local device, local servers, or the cloud service provider's servers.

FIG. 2 shows an illustrative environment in which various operations or tasks 205 can be executed across one or multiple computing devices which are local or remote to the user. Operations or tasks to be performed can include computations, application execution, data transfer, and the like. The user may execute operations at the local client device 105, local servers 210 which may be on the same LAN as the local device, or cloud servers 215 operated by the cloud service provider. The customer may utilize a hybrid computing environment in which a combination of local and cloud computing devices are simultaneously utilized. This may occur, for example, if the cloud servers are configured to handle certain operations or the cloud servers take over some processing to off-set demand.

Figure 3:
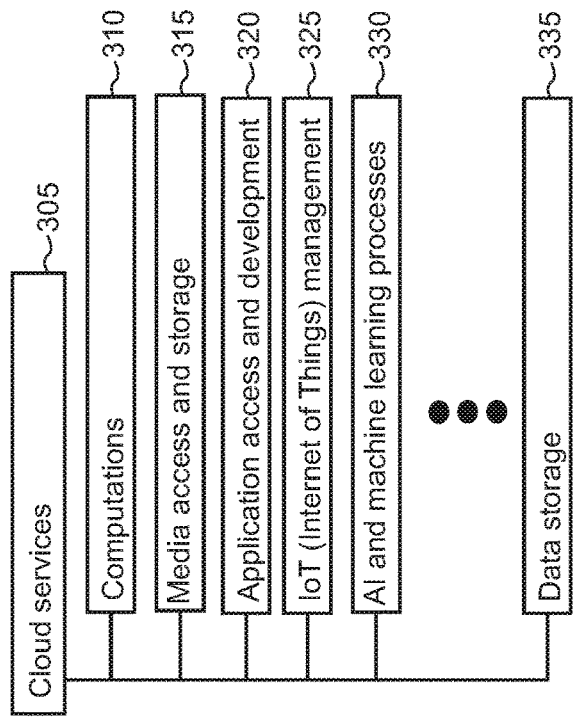
FIG. 3 shows an illustrative taxonomy of non-exhaustive services provided to customers by the cloud service provider.

FIG. 3 shows an illustrative taxonomy of cloud services 305 provided by a cloud service provider to a customer operating on-premises computing devices such as a server, laptop computer, desktop computer, smartphone, tablet computer, etc. Provided services can include computations 310, media access and storage 315, application access and development 320, IoT management 325, AI (Artificial Intelligence) and machine learning processes 330, and data storage 335, among other services.

Figure 4:
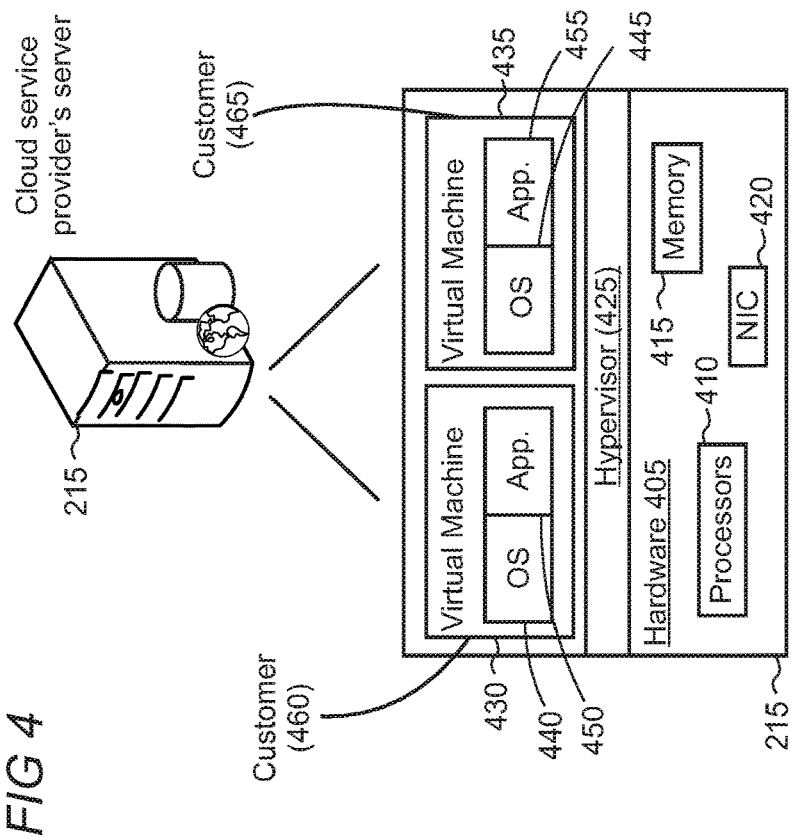
FIG. 4 shows an illustrative system architecture of the cloud service provider's servers.

FIG. 4 shows an abstraction of an illustrative system architecture of the cloud service provider's server 215. At the hardware layer 405 the server may be configured with one or more processors 410 including central processing units (CPUs) and graphic processing units (GPUs) to perform various operations and computations. Memory 415 can include data and instructions to instruct the processors' operations, and a network interface card (NIC) 420 may provide access to the Internet to transmit, receive, and package data to and from other nodes of the network. A hypervisor 425 is installed and utilized by the server to execute one or more virtual machines on the server, which in this instance includes virtual machines 430 and 435. The hypervisor enables virtual machine operations by handling the allocation and utilization of virtual hardware for the respective virtual machines using the server's actual hardware, including processor, memory, and NIC usage.

The virtual machines can operate respective operating systems (OSs) 440 and 445 with respectively installed applications (Apps.) 450 and 455. OSs which may operate on the virtual machines can include Windows®, Linux®, and SQL Server®, in which applications are those which are compatible with the operating system, whether the applications are developed by first or third parties. The use of virtual machines is one method which facilitates the multi-customer use of a cloud computing server, as illustratively shown by numerals 460 and 465. Customers 460 and 465 may be different customers which utilize different virtual machines operating on the same server.

FIG. 5 shows an illustrative diagram of management services offered by the cloud service provider depending on the unique customer's setup. Depending on the customer's subscription to the cloud service provider, certain responsibilities and/or tasks may be managed by the cloud service provider or the customer, as illustratively shown using the table 525. On one end of the spectrum is on-premises operations 505 in which the customer manages all of the responsibilities and functions of local servers. On the other end of spectrum is Software as a Service (SaaS) 520 in which the cloud service provider manages all of the responsibilities, such as providing web applications which run through an end user's web browser. Infrastructure as a Service (IaaS) 510 and Platform as a Service (PaaS) 515 provide a hybrid approach. Infrastructure as a Service enables users to access, monitor, and manage remote datacenters to avoid purchasing localized hardware. Platform as a Service enables users to provide cloud computing solutions while utilizing a framework from which they can develop or customize applications for users.

Figure 6:
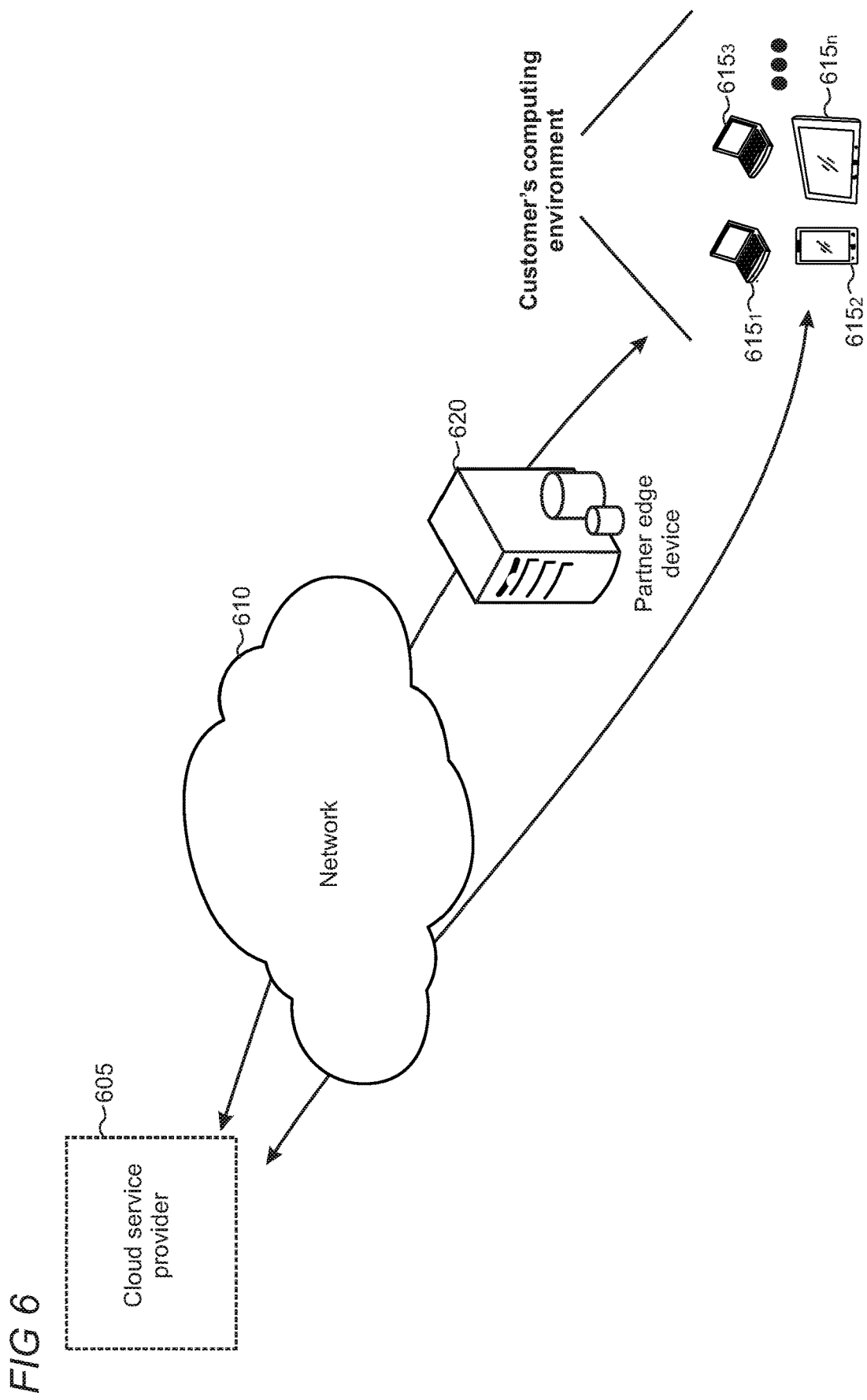
FIG. 6 shows an illustrative environment of the cloud service provider's operability with a customer's network.

FIG. 6 shows an illustrative environment in which a cloud service provider 605 interacts over a network 610 with a customer's computing environment including client devices 615. In some implementations the customer's computing environment can include a partner edge device 620 which may be utilized by the various client devices and perform its own operations separate from the cloud service provider.

FIG. 7 shows exemplary computing environments of the cloud service provider 605. In one exemplary embodiment a remote cloud service 720 operating on one or more servers provides the cloud functionalities for a customer's services. In another embodiment the provider may be configured with an enterprise edge device 705 which takes over network control and then provides access to public cloud services 710 and private cloud services 715. The private cloud services may be that which is provided to a customer via a subscription or other payment option. The private services may be the various options depicted in FIG. 5 (i.e., IaaS, PaaS, and SaaS). The public cloud services may be that which is provided over the public internet in which anyone can access for free, on-demand, per usage, or by other metric.

FIG. 8 shows an illustrative diagram of a remote server (or other computing device) 805 configured with a hypervisor (not shown) and virtual machines as representatively shown by numerals 810. The remote server 805 may be public or private servers that offer various services to a customer's computing environment over a network. In some implementations, the remote server 805 may be associated with and accessible by a single customer entity, in which the virtual machines are each utilized by that single customer entity. In other scenarios, multiple customers may utilize a single remote server, as discussed with respect to FIG. 4. An enterprise edge device as shown in FIG. 7 may take over network control when the customer accesses the remote server, such that the edge device sits between the remote server and a customer's computing device. While the edge device is depicted as a server, it may alternatively or additionally be a networking device like a router to direct traffic. The edge device is at the edge of the provider's network, such that it is the first point of contact at the provider's network and the last hop before leaving the provider's network.

The virtual machines may operate their own respective OSs 820 and applications 815 as discussed above with respect to FIG. 4. The virtual machines may be dedicated to particular applications or departments within a company, such as a finance department, marketing department, human resources department, etc. The virtual machines operate within a virtual network 825 to route data packets to the appropriate virtual machine, which operates as an overlay to the physical network 830 (e.g., the NIC). Using the physical network, the remote server can transmit to and receive packets from other nodes of the network and in the cloud, as representatively shown by numeral 835. FIG. 9 shows an illustrative representation of a customer that utilizes multiple remote servers 805 in which each server can implement multiple virtual machines 810 to perform various operations or to serve a given department. An enterprise edge device may handle operations and data transfers from the respective remote servers to a customer's computing device.

Figure 10:
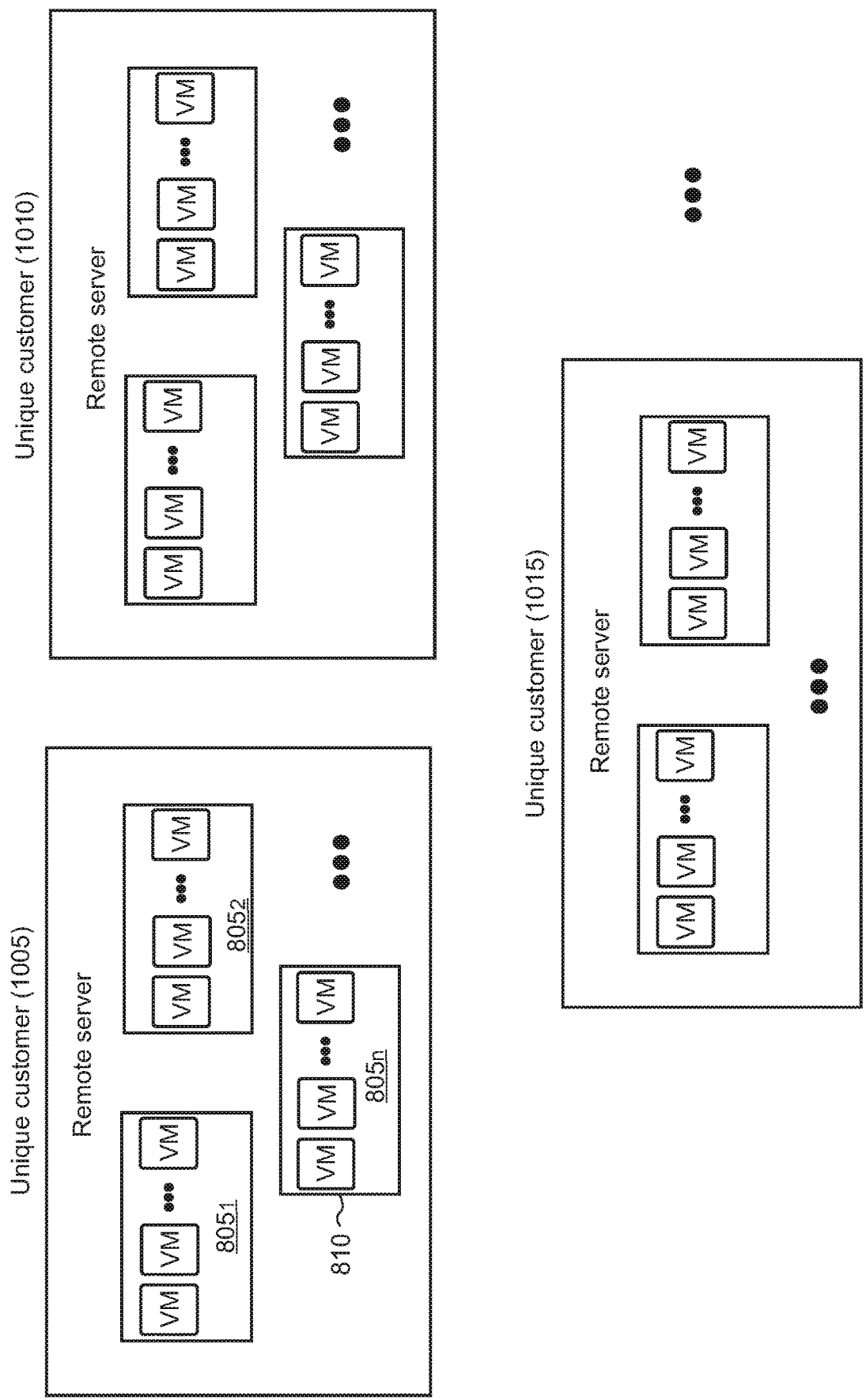
FIG. 10 shows an illustrative diagram in which multiple unique customers utilize respective remote servers with virtual machines.

FIG. 10 shows an illustrative diagram in which unique and distinct customers 1005, 1010, and 1015 each control and operate their own respective remote servers with virtual machines. Each remote server utilized for cloud services precipitates increased scalability for the cloud service provider to handle the number of connected devices.

Figure 11:
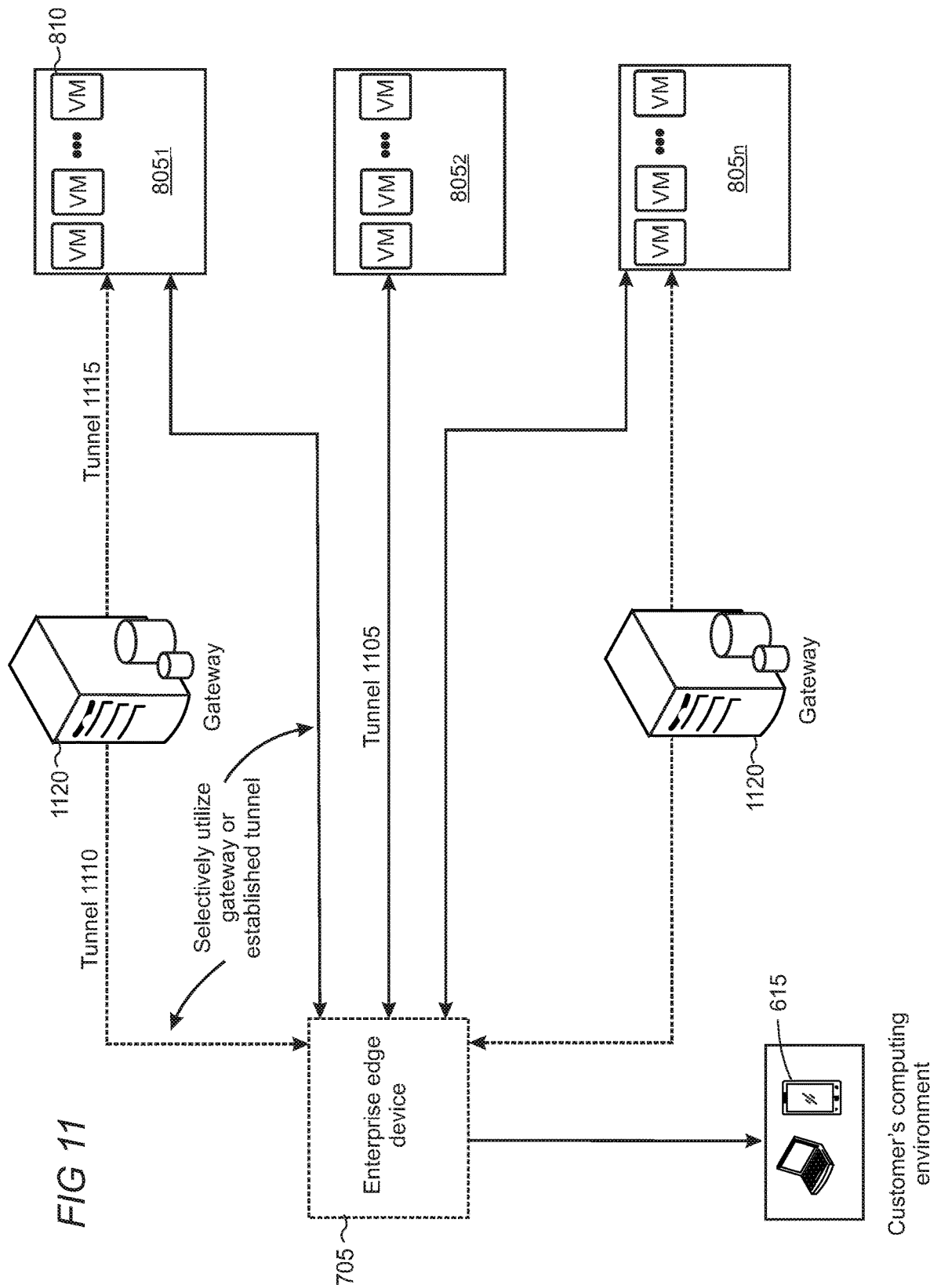
FIG. 11 shows an illustrative environment in which an enterprise edge device can selectively utilize a gateway or a single tunnel to transmit data packets to each respective remote server.

FIG. 11 shows an illustrative environment in which the enterprise edge device 705 is configured to establish a single tunnel 1105 with each respective remote server 805 and utilizes the tunnel to transmit data packets to and receive data packets from virtual machines 810. A customer using exemplary devices 615 may access, use, and control data transmissions upon request, which are routed through the edge device to the necessary remote server and virtual machine. Each remote server or other computing device connects with and uses a single tunnel with the edge device, and the single tunnel can transmit data packets to multiple virtual machines. While additional tunnels can be implemented between the provider and individual virtual machines, the present implementation employs a single tunnel object to communicate with multiple virtual machines on a remote server to increase scalability. Thus, in the depicted implementation a single tunnel is utilized between the edge device and a respective remote server at least during packet transmission, such that no other tunnels are established and used between the edge device and the remote server.

Tunneling provides data transmissions through private networks over a public network, during which the packets are encrypted and encapsulated. Exemplary protocols for tunneling include PPTP (Point-to-Point Tunneling Protocol) and L2TP (Layer 2 Tunneling Protocol). The tunnels are dynamic in that, while they may be utilized for a single customer's remote server for a period of time, eventually that tunnel can be used for another device if, for example, the original server goes stale.

The enterprise edge device 705 may simultaneously be configured to transmit data using tunnel 1110 which is connected to a gateway 1120 positioned between the remote servers 805 and the edge device. Upon receipt the gateway forwards the data packet to the destined virtual machine using tunnel 1115. Although FIG. 11 depicts the gateways connected to a single remote server, in implementation the gateways can connect and transmit data to multiple customer servers.

The provider may select which data path to use, that is, the gateway or direct transmission to the remote server using the single tunnel 1105. The gateway may be used as a backup if the provider does not know the destination addresses to contact a virtual machine or physical device or based on a given scenario. For example, the extent to which a customer experiences latency or a lack of latency may dictate which data path to use since the tunnel 1105 can decrease latency as discussed below. The provider's enterprise edge device 705 may track latency and other issues with transmissions to specific virtual machines and can in turn automatically use the tunnel 1105 if, for example, latency through the gateway exceeds a threshold.

In typical implementations the tunnel 1105 may be utilized to reduce the number of hops between the enterprise edge device 705 and the remote server 805. For example, using the gateway adds an additional processing step between the edge device and the remote server which can increase latency and add another point of failure to the communications. Using the single tunnel can decrease latency and remove that potential point of failure. In addition, using a single tunnel interface can also help the collection of data for various networking features in one place, such as policing, firewalls, counters, etc.

Figure 12:
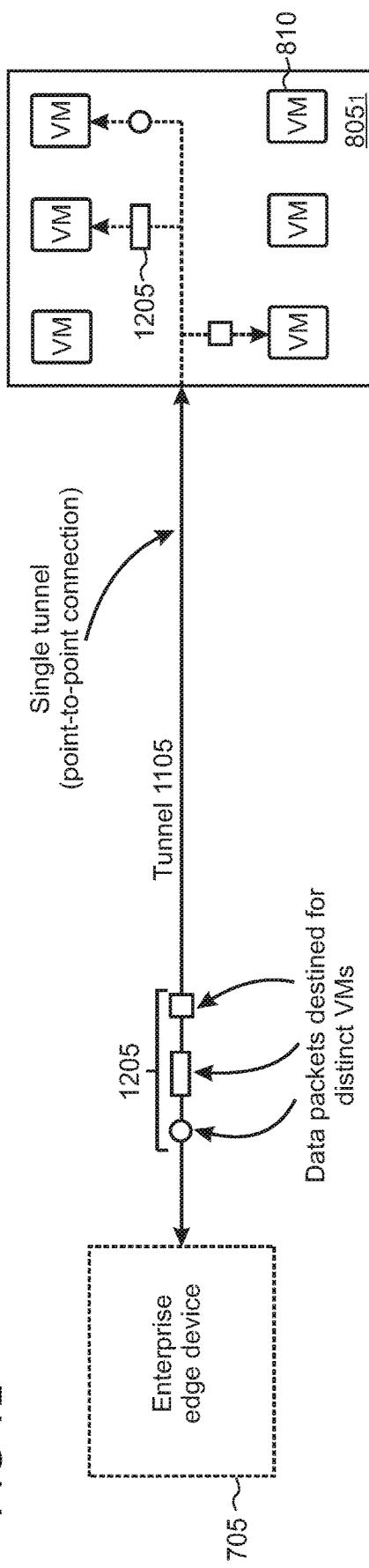
FIG. 12 shows an illustrative diagram in which the single tunnel can transport multiple data packets which are each destined to specific virtual machines on the remote server.

FIG. 12 shows an illustrative environment in which data packets 1205 destined for specific virtual machines 810 are transmitted over the same single tunnel 1105 and arrive at the appropriate destination. The shapes for the data packets represent the unique virtual machine which they are destined for. The data packets are each capable of traversing the single tunnel and arriving at the appropriate destination while still not intersecting with an unintended virtual machine. Thus, the single tunnel operates as a one-to-many tool between the provider and the customer's server. The single tunnel is flexibly implemented in that it can initialize and establish a connection to a respective virtual machine at the time of packet transmission, and then subsequently initiate and establish another point-to-point connection with another virtual machine.

Figure 13:
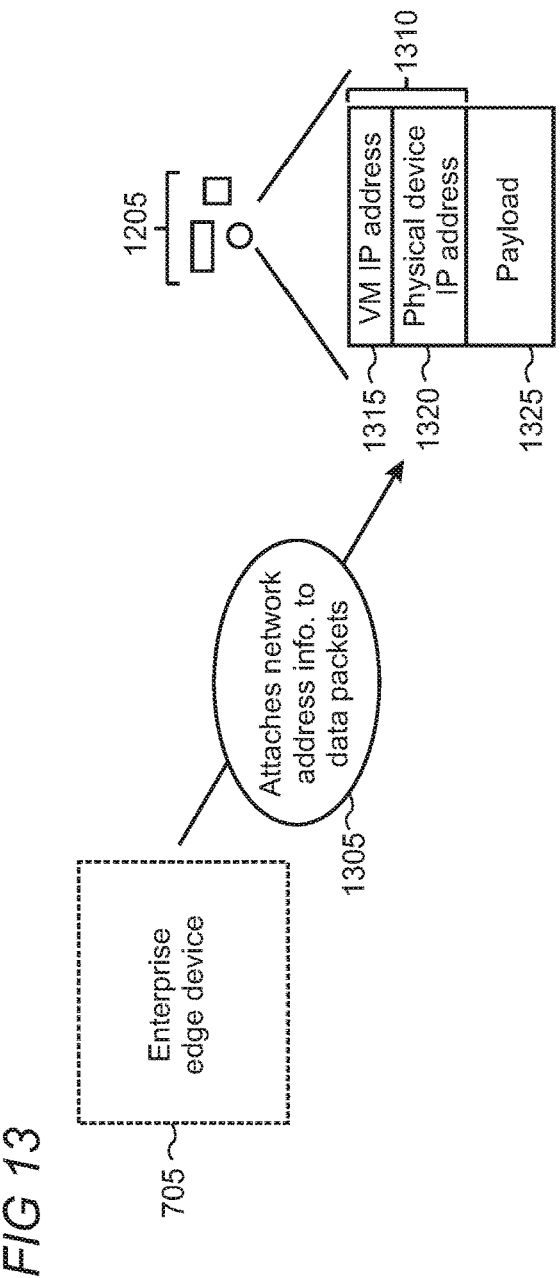
FIG. 13 shows an illustrative diagram in which the enterprise edge device attaches network address information to each data packet for transmission to the appropriate virtual machine.

FIG. 13 shows an illustrative diagram in which the enterprise edge device 705 uses and attaches network address information to data packets 1205 before transmission as illustratively shown by numeral 1305. The configuration and contents of the data packets can include, for example, network address information 1310 which the provider utilizes to transmit data directly to the physical device and intended virtual machine. The network address information can include the virtual machine's IP (Internet Protocol) address 1315 and the physical device's IP address 1320. The physical device may alternatively utilize a MAC (Media Access Control) address. The data packet further includes the payload 1325 which is the actual and intended data destined for the virtual machine. The edge device receives and stores the network address information for each remote server and virtual machine associated with a customer. The information may be received directly from the remote server, the virtual machines, or from the gateway 1120 which may have previously been used to transmit data to the virtual machines.

Figure 14:
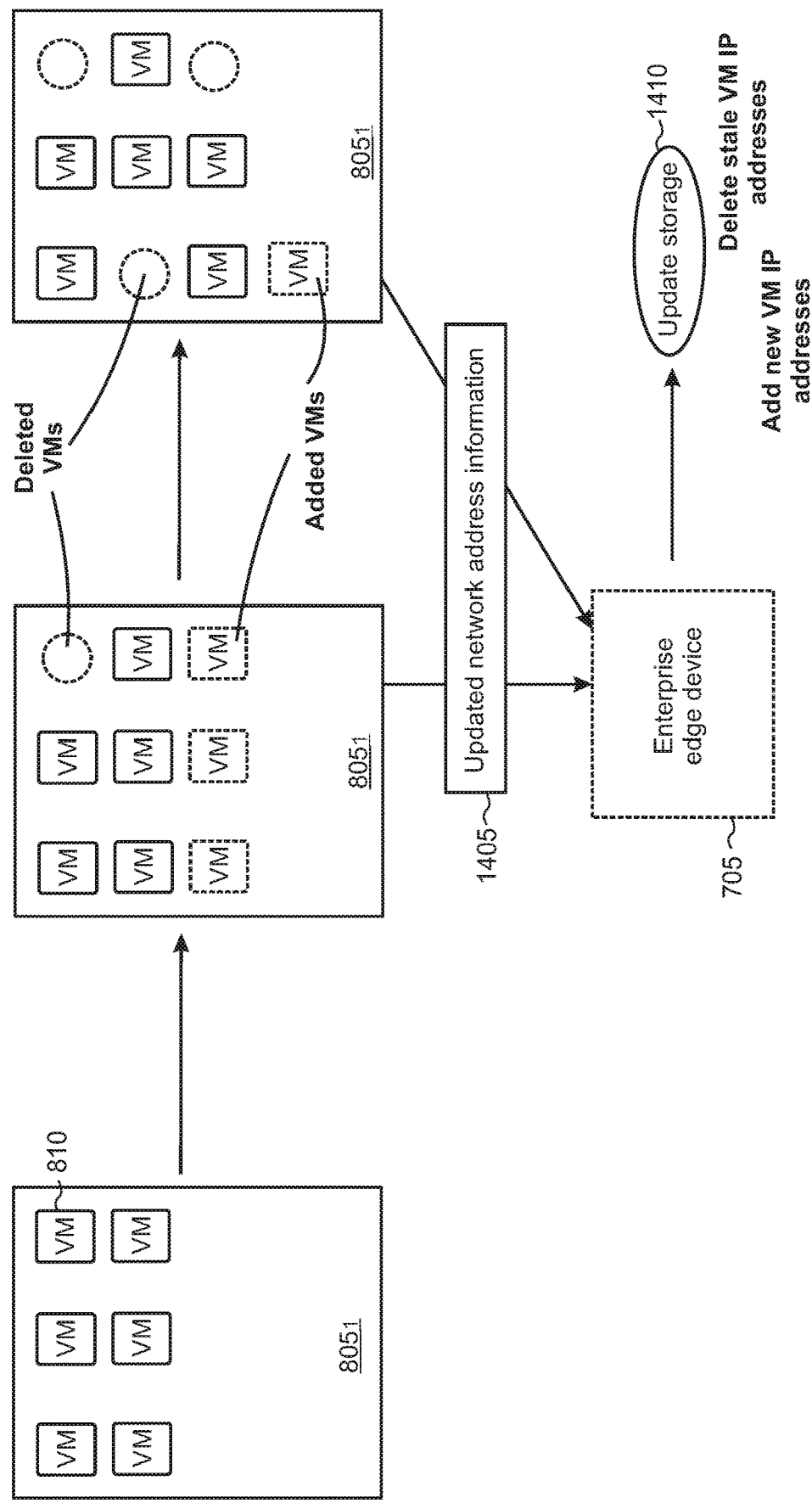
FIG. 14 shows an environment in which the enterprise edge device dynamically updates virtual machine network address information for the remote server.

FIG. 14 shows an illustrative environment in which the number of virtual machines operating on a remote server 805 can periodically change. For example, the virtual machines are deleted and added in each sequential representation of the remote server. The updates to the server are transmitted to the enterprise edge device 705 to update its database accordingly, as representatively illustrated by numerals 1405 and 1410. Updates at the edge device can include deleting stale IP addresses for deleted virtual machines and adding new IP addresses for newly added virtual machines. The updates enable the continued utilization of the single tunnel and communication with the appropriate virtual machines.

Figure 15:
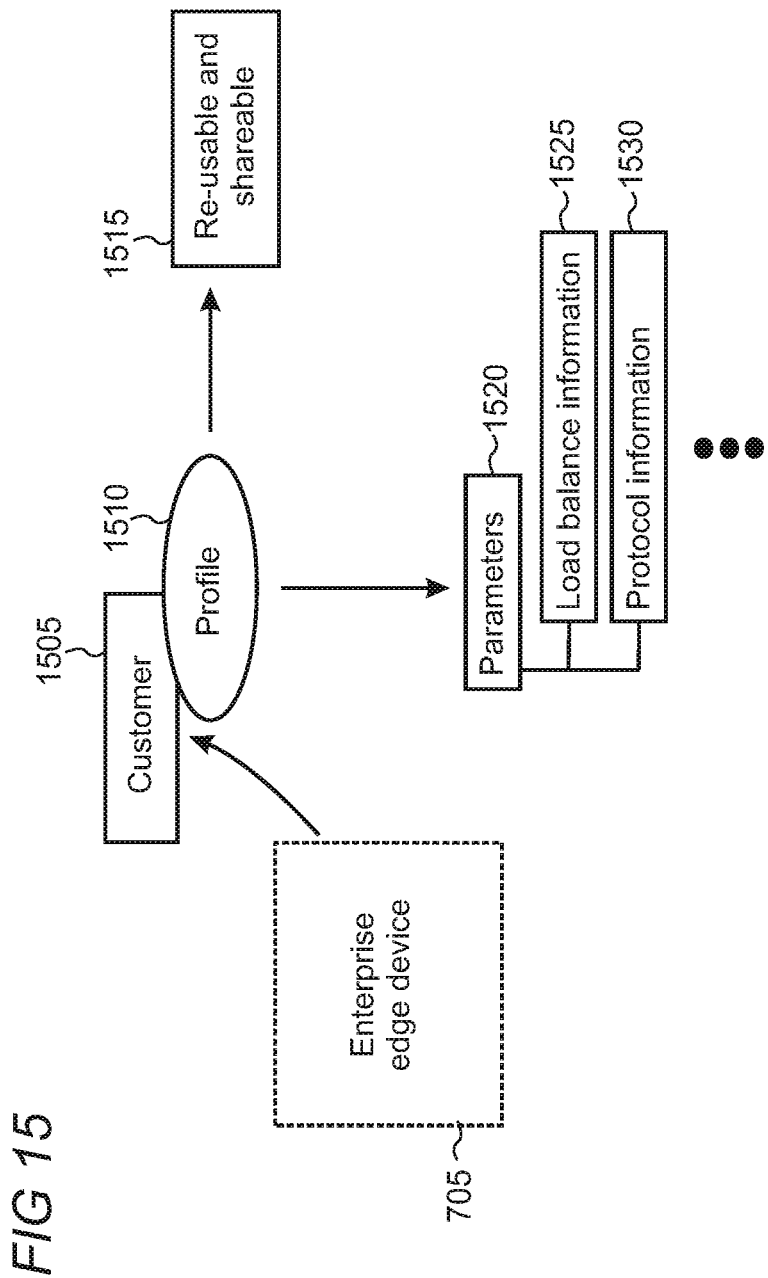
FIG. 15 shows the enterprise edge device using parameters associated with customer profiles when transmitting data packets.

FIG. 15 shows an illustrative diagram in which the enterprise edge device 705 stores a profile 1510 for each respective customer 1505. The profiles are re-usable and shareable 1515 among other devices and customers, and include parameters 1520 that detail networking information between the cloud service provider's devices and a remote server associated with a customer. Exemplary parameters include load balance information 1525 and protocol information 1530. Using the parameters, the provider is enabled to appropriately communicate with a customer's computing device, the remote server, and the virtual machines on the remote server.

Figure 16:
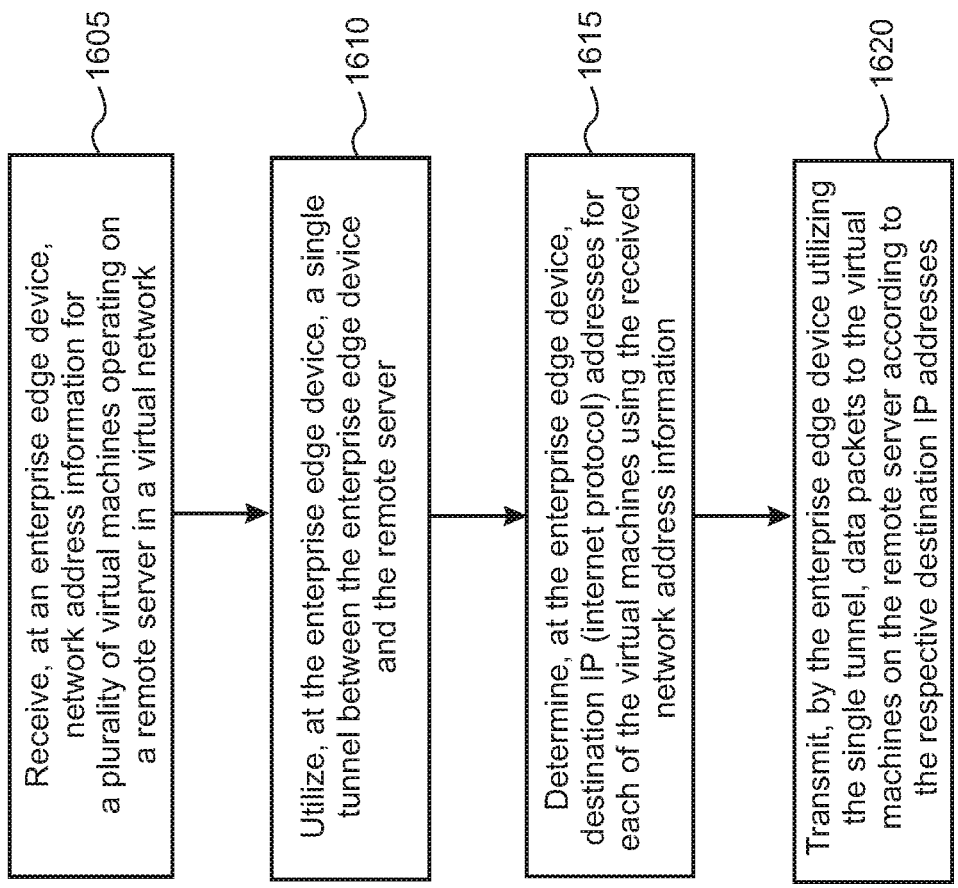
FIGS. 16-18 show illustrative processes performed by the provider's enterprise edge device operating individually or collectively with the remote server.

FIG. 16 is a flowchart of an illustrative method 1600 in which an enterprise edge device may perform. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1605, network address information is received at the enterprise edge device for a plurality of virtual machines operating on a remote server in a virtual network. In step 1610, the enterprise edge device utilizes a single tunnel between the enterprise edge device and the remote server. The single tunnel is configured for transmitting information to the virtual machines operating on the remote server. In step 1615, the enterprise edge device determines destination IP (internet protocol) addresses for each of the virtual machines using the received network address information. In step 1620, the enterprise edge device transmits data packets to the virtual machines on the remote server according to the respective destination IP addresses.

Figure 17:
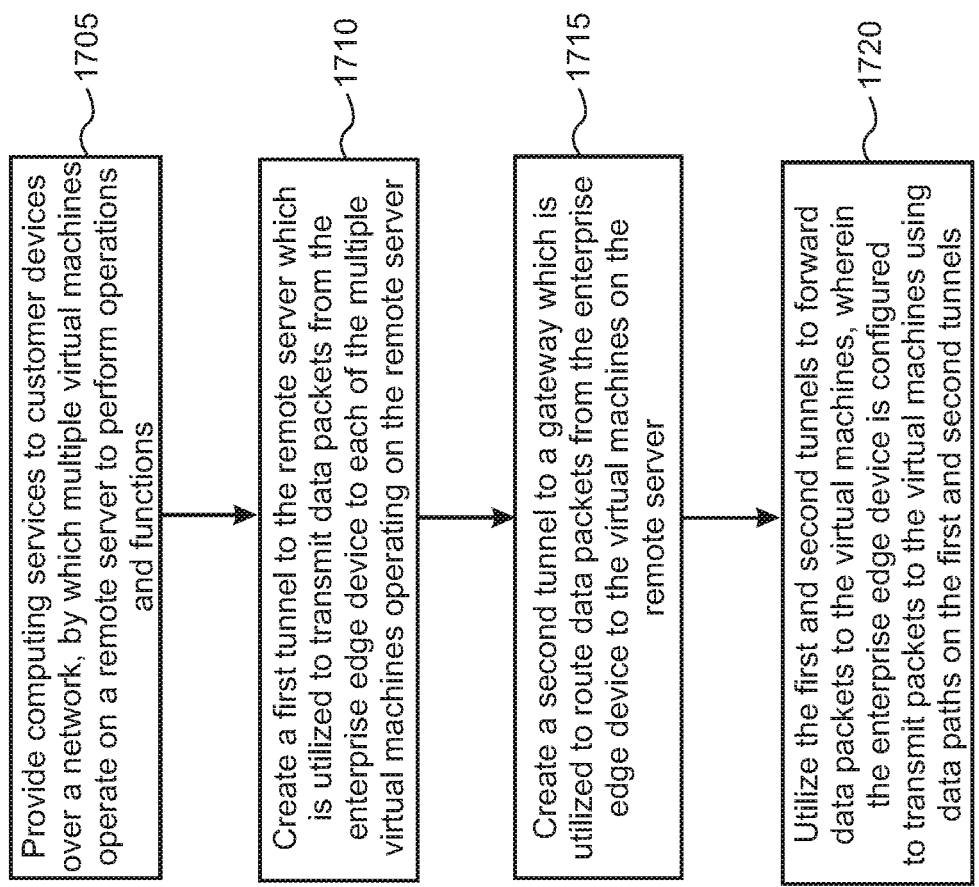

FIG. 17 is a flowchart of an illustrative method 1700 performed by an enterprise edge device such as one or more servers. In step 1705, computing services are provided to customer devices over a network, by which multiple virtual machines operate on a remote server to perform operations and functions. The enterprise edge device is in communication with the remote server. In step 1710, a first tunnel is created to the remote server which is utilized to transmit data packets from the enterprise edge device to each of the multiple virtual machines operating on the remote server. In step 1715, a second tunnel is created to a gateway which is configured to route data packets from the enterprise edge device to the virtual machines operating on the remote server. In step 1720, the first and second tunnels are utilized to forward data packets to the virtual machines, in which the enterprise edge device is configured to transmit data packets to the virtual machines using data paths on the first and second tunnels.

Figure 18:
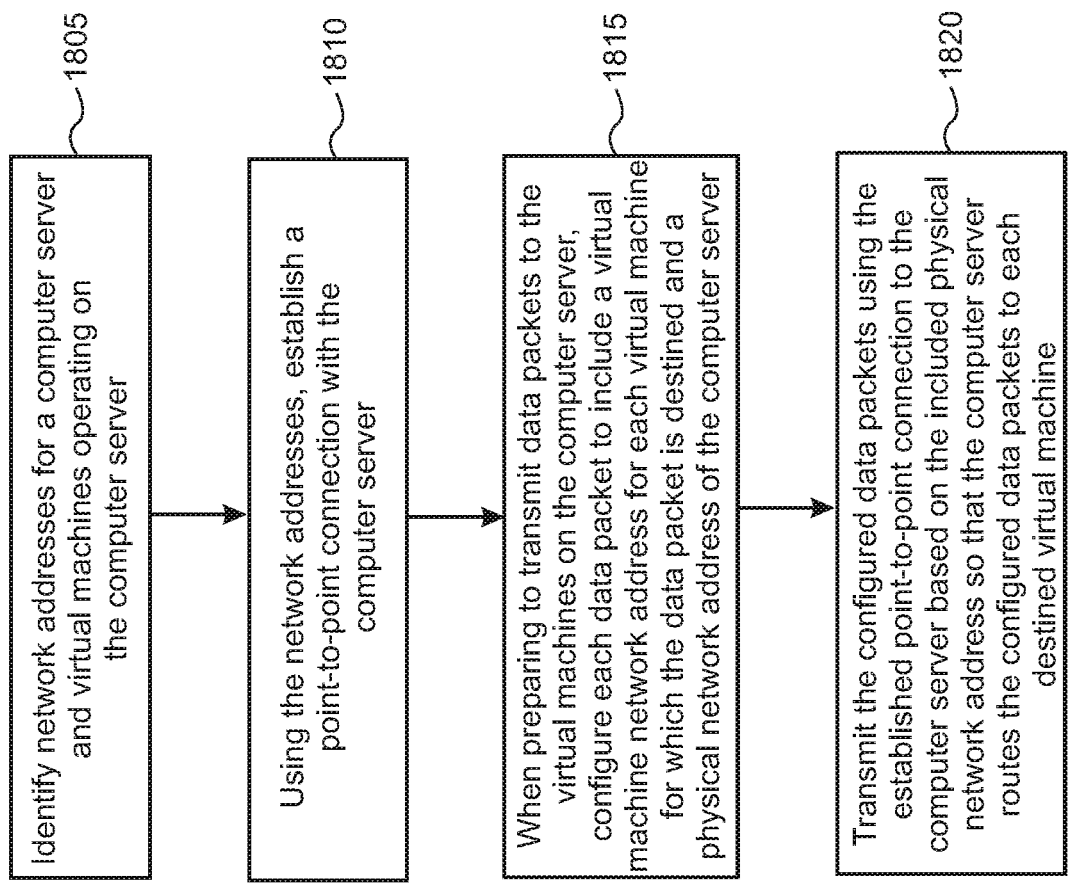

FIG. 18 is a flowchart of an illustrative method 1800 performed by an enterprise edge device operated by an enterprise edge device. In step 1805, network addresses are identified for a computer server and virtual machines operating on the computer server. In step 1810, using the network addresses, a point-to-point connection is established with the computer server. The point-to-point connection supports encryption and encapsulation of data exchanged between the enterprise edge device and the computer server. In step 1815, when preparing to transmit data packets to multiple virtual machines on the computer server, each data packet is configured to include a virtual machine network address for each virtual machine for which the data packet is destined and a physical network address of the computer server. In step 1820, the configured data packets are transmitted to the computer server using the established point-to-point connection based on the included physical network address so that the computer server routes the configured data packets to each destined virtual machine.

Figure 19:
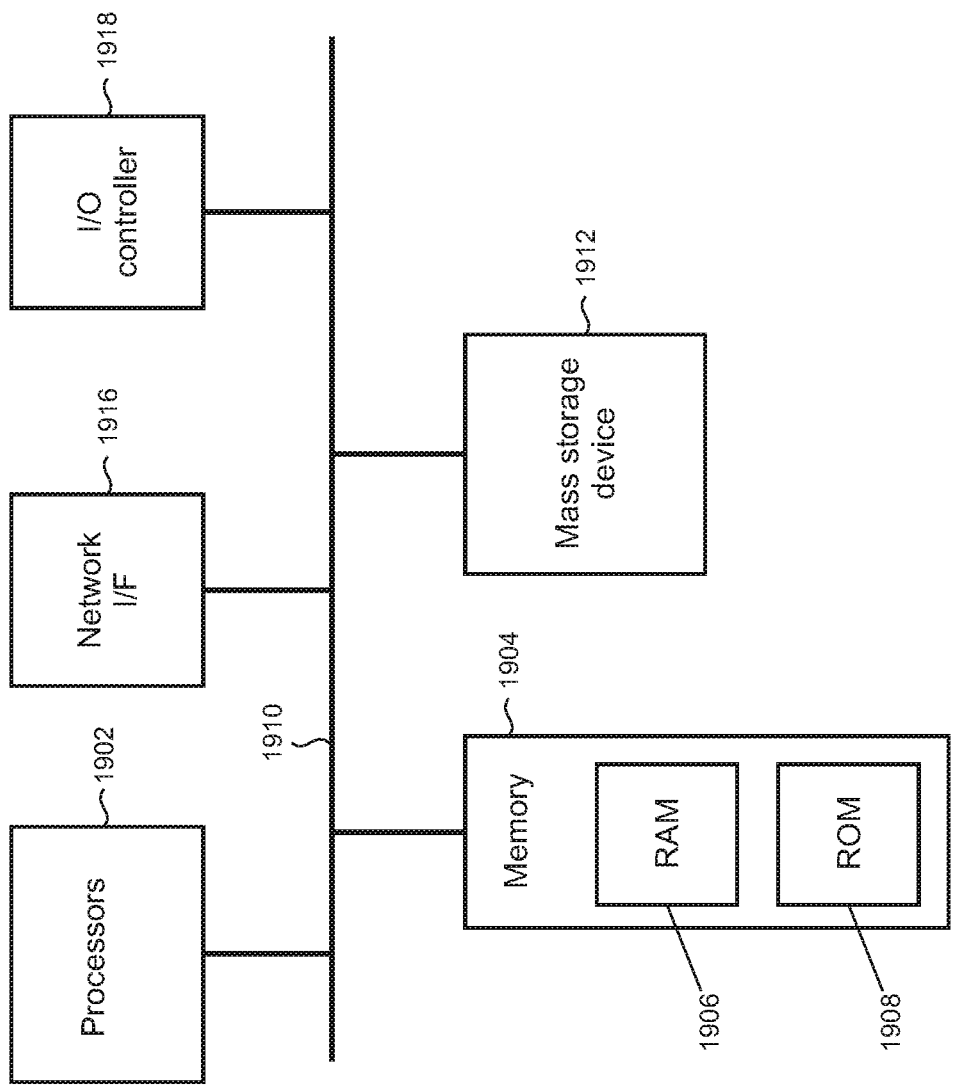
FIG. 19 is a simplified block diagram of an illustrative computer system that may be used in part to implement the present flexible unnumbered destination tunnels for virtual networks.

FIG. 19 shows an illustrative architecture 1900 for a device capable of executing the various components described herein for flexible unnumbered destination tunnels for virtual networks. The architecture 1900 illustrated in FIG. 19 includes one or more processors 1902 (e.g., central processing unit, dedicated AI chip, graphic processing unit, etc.), a system memory 1904, including RAM (random access memory) 1906 and ROM (read only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

The architecture 1900 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1900 may include a gesture recognition unit (not shown) to facilitate user interaction with a device supporting the architecture through sensed gestures, movements, and/or other sensed inputs.

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
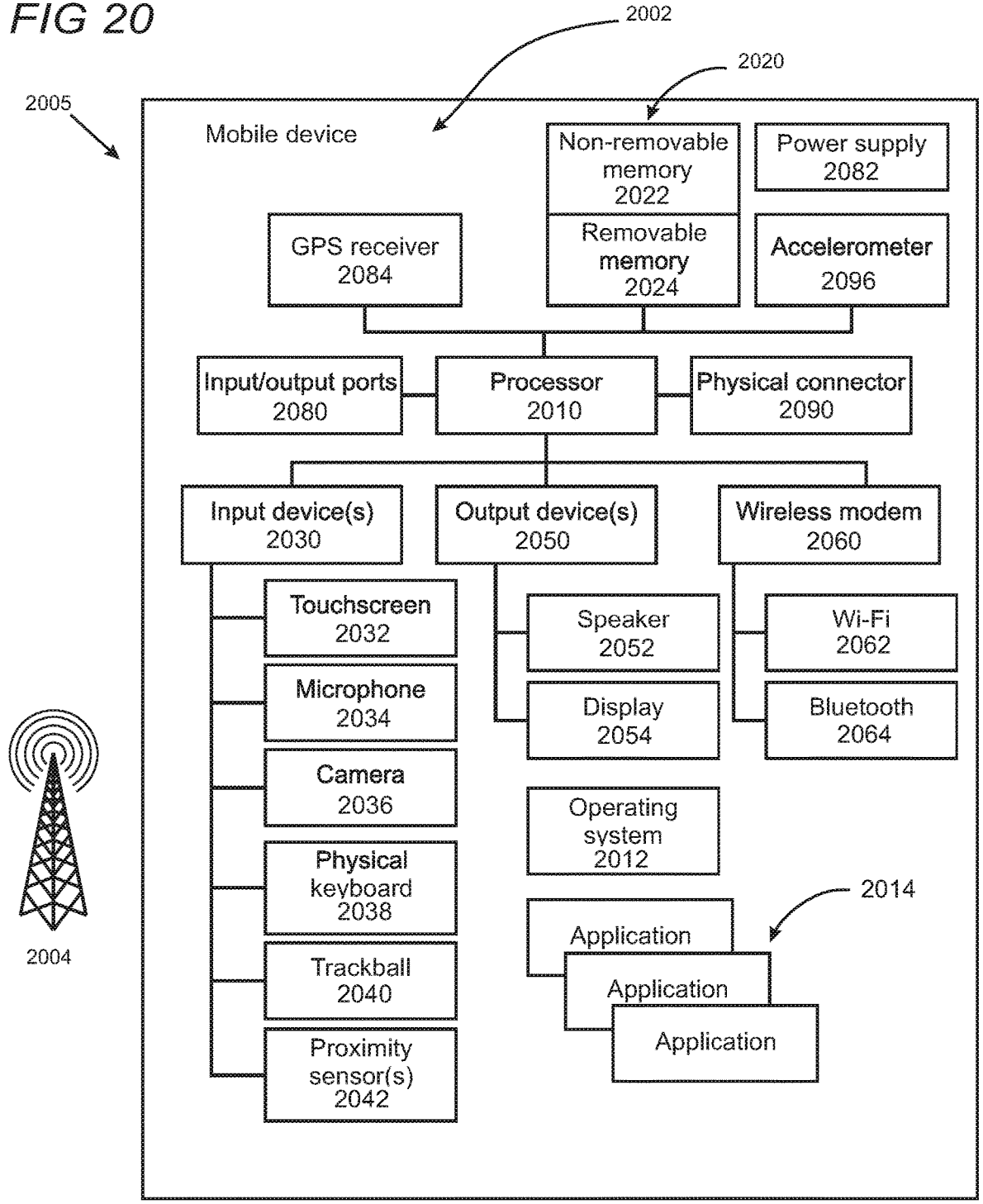
FIG. 20 is a block diagram of an illustrative user computing device such as a mobile phone or smartphone that may be used in part to implement the present flexible unnumbered destination tunnels for virtual networks.

FIG. 20 is a functional block diagram of an illustrative computing device 2005 such as a mobile phone, smartphone, or other computing device including a variety of optional hardware and software components, shown generally at 2002, which may access a cloud service provider's servers. Any component 2002 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2004, such as a cellular or satellite network.

The illustrated device 2005 can include a controller or processor 2010 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2012 can control the allocation and usage of the components 2002, including power states, above-lock states, and below-lock states, and provides support for one or more application programs 2014. The application programs can include common mobile computing applications (e.g., image-capture applications, e-mail applications, calendars, contact managers, web browsers, messaging applications), or any other computing application.

The illustrated device 2005 can include memory 2020. Memory 2020 can include non-removable memory 2022 and/or removable memory 2024. The non-removable memory 2022 can include RAM, ROM, Flash memory, a hard disk, or other well-known memory storage technologies. The removable memory 2024 can include Flash memory or a Subscriber Identity Module (SIM) card, which is well known in GSM (Global System for Mobile communications) systems, or other well-known memory storage technologies, such as "smart cards." The memory 2020 can be used for storing data and/or code for running the operating system 2012 and the application programs 2014. Example data can include web pages, text, images, sound files, video data, or other data sets to be sent to and/or received from one or more network servers or other devices via one or more wired or wireless networks.

The memory 2020 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 2005.

The memory 2020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 2005 can support one or more input devices 2030—such as a touchscreen 2032; microphone 2034 for implementation of voice input for voice recognition, voice commands, and the like; camera 2036; physical keyboard 2038; trackball 2040; and/or proximity sensor 2042; and one or more output devices 2050—such as a speaker 2052 and one or more displays 2054. Other input devices (not shown) using gesture recognition may also be utilized in some cases. Other possible output devices (not shown) can include piezoelectric or haptic output devices. Some devices can serve more than one input/output function. For example, touchscreen 2032 and display 2054 can be combined into a single input/output device.

A wireless modem 2060 can be coupled to an antenna (not shown) and can support two-way communications between the processor 2010 and external devices, as is well understood in the art. The modem 2060 is shown generically and can include a cellular modem for communicating with the mobile communication network 2004 and/or other radio-based modems (e.g., Bluetooth 2064 or Wi-Fi 2062). The wireless modem 2060 is typically configured for communication with one or more cellular networks, such as a GSM network for data and voice communications within a single cellular network, between cellular networks, or between the device and a public switched telephone network (PSTN).

The device can further include at least one input/output port 2080, a power supply 2082, a satellite navigation system receiver 2084, such as a GPS receiver, an accelerometer 2096, a gyroscope (not shown), and/or a physical connector 2090, which can be a USB port, IEEE 1394 (FireWire) port, and/or an RS-232 port. The illustrated components 2002 are not required or all-inclusive, as any components can be deleted and other components can be added.

Figure 21:
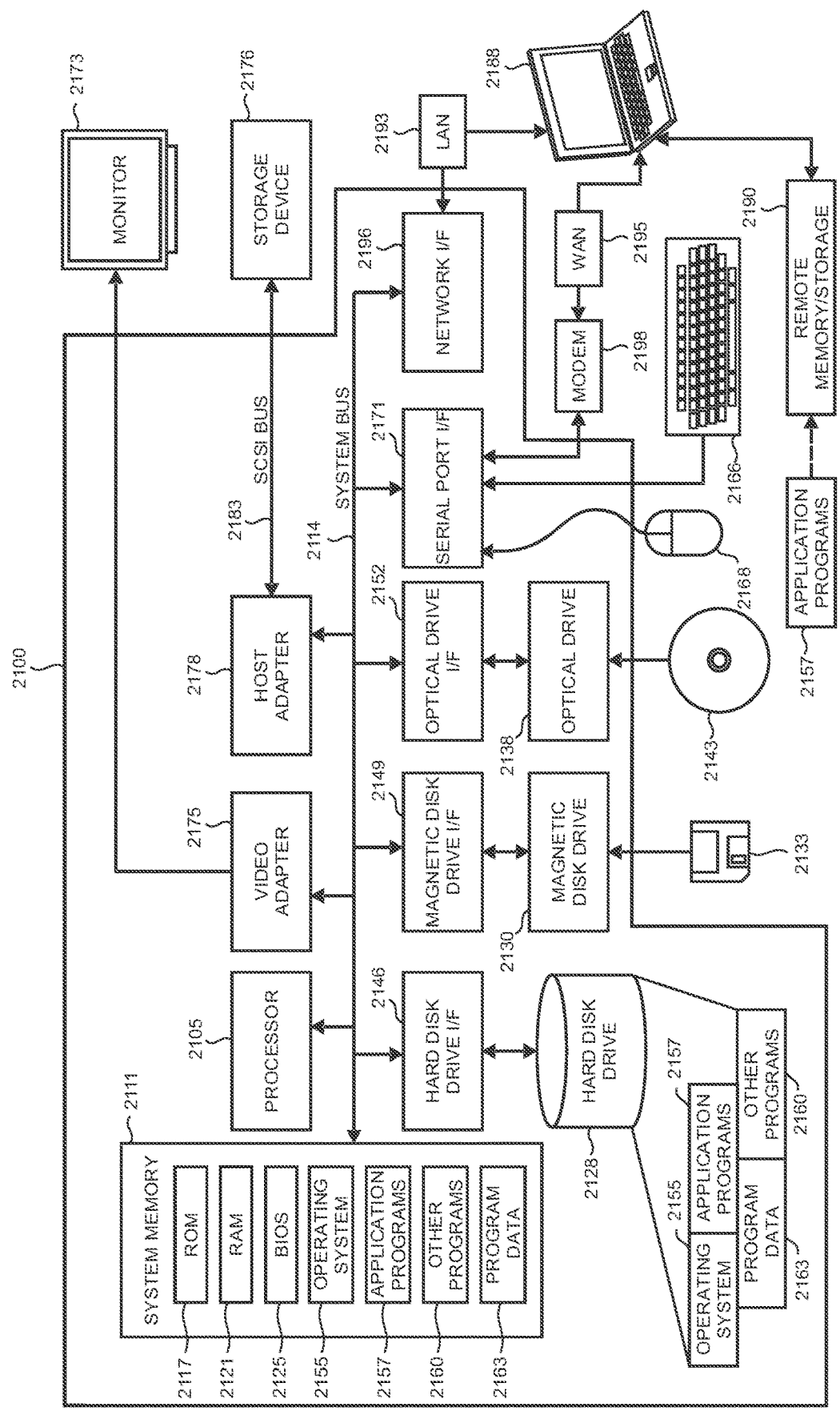
FIG. 21 is a simplified block diagram of an illustrative computing system or server that may be used in part to implement the present flexible unnumbered destination tunnels for virtual networks.

FIG. 21 is a simplified block diagram of an illustrative computer system 2100 such as a server which may be used to implement the present flexible unnumbered destination tunnels for virtual networks. Additionally, the master drone may be configured as such in order to process the sensor data and build the map of the physical environment. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present flexible unnumbered destination tunnels for virtual networks. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, wearable devices and personal computers can typically include other peripheral output devices (not shown), such as speakers and printers. The illustrative example shown in FIG. 21 also includes a host adapter 2178, a Small Computer System Interface (SCSI) bus 2183, and an external storage device 2176 connected to the SCSI bus 2183.

The computer system 2100 is operable in a networked environment using logical connections to one or more remote computers, such as a remote computer 2188. The remote computer 2188 may be selected as a personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of the present flexible unnumbered destination tunnels for virtual networks.

Various exemplary embodiments of the present flexible unnumbered destination tunnels for virtual networks are now presented by way of illustration and not as an exhaustive list of all embodiments. An example includes a method performed by an enterprise edge device to tunnel data packets in a cloud network from the enterprise edge device to a remote server, comprising: receiving, at the enterprise edge device, network address information for a plurality of virtual machines operating on a remote server in a virtual network; utilizing, by the enterprise edge device, a single tunnel between the enterprise edge device and the remote server, in which the single tunnel is configured for transmitting information to the plurality of virtual machines operating on the remote server; determining, at the enterprise edge device, respective destination IP (Internet Protocol) addresses for each of the virtual machines in the plurality of virtual machines operating on the remote server using the received network address information; and transmitting, by the enterprise edge device utilizing the single tunnel, data packets to respective virtual machines operating on the remote server according to the respective destination IP addresses.

In another example, the single tunnel is a point-to-point connection between the enterprise edge device and the remote server and no other single tunnel is presently in operation between the enterprise edge device and the remote server during the transmission, in which the point-to-point connection supports encryption and encapsulation of data exchanged between the enterprise edge device and the remote server. In another example, the virtual machines on the remote server are associated with a single company entity. In another example, the virtual machines for the single company entity form one set of virtual machines, and one or more remote servers further support multiple different sets of virtual machines that are respectively associated with different company entities. In another example, the network address information includes a virtual IP address for each virtual machine and a physical IP address for the remote server, and the destination IP address is determined using both the virtual IP address and the physical IP address to transmit the data packets. In another example, the method further includes receiving a profile for the remote server, the profile including a set of parameters by which to handle at least networking and data transmissions to the remote server from the enterprise edge device; and configuring the data packet according to the parameters included in the profile. In another example, a destination IP address is determined when the enterprise edge device is preparing to transmit the data packets to a virtual machine.

A further example includes one or more hardware-based non-transitory computer-readable memory devices storing instructions which, when executed by one or more processors disposed in an enterprise edge device associated with a cloud-service provider, cause the enterprise edge device to: provide computing services to customer devices over a network, by which multiple virtual machines operate on a remote server to perform operations and functions, the enterprise edge device being in communication with the remote server; create a first tunnel to the remote server which is utilized to transmit data packets from the enterprise edge device to each of the multiple virtual machines operating on the remote server; create a second tunnel to a gateway which is utilized to route data packets from the enterprise edge device to the virtual machines on the remote server; and utilize the first and second tunnels to forward data packets to the virtual machines, wherein the enterprise edge device is configured to transmit data packets to the virtual machines using data paths on the first and second tunnels.

In another example, the one or more processors further cause the enterprise edge device to: receive network address information for each virtual machine on the remote server;

attach a network address for a virtual machine to a data packet at least when using the first tunnel; and use the attached network address information to forward the data packet to the virtual machine on the remote server for which the data packet is destined. In another example, the network address information includes virtual IP (Internet Protocol) address information for each virtual machine and physical IP address information for the remote server. In another example, the enterprise edge device is configured to selectively utilize the first and second tunnels per data transmission. In another example, the enterprise edge device utilizes the first tunnel to decrease latency in forwarding data packets to the virtual machines relative to the utilization of the second tunnel. In another example, the remote server is associated with a single customer, and further including a plurality of remote servers associated with the single customer, in which each of the plurality of remote servers has a tunnel which respectively provides a point-to-point connection between the enterprise edge device and a remote server among the plurality of remote servers. In another example, the first tunnel and the respective tunnels are each dynamically configured to be utilized with different remote servers when an original remote server goes stale.

A further example includes an enterprise edge device configured to interact with computer servers in a virtualized network, comprising: one or more processors; and one or more hardware-based non-transitory memory devices storing computer-readable instructions which, when executed by the one or more processors cause the enterprise edge device to: identify a network address for a computer server and virtual machines operating on the computer server; using the network address, establish a point-to-point connection with the computer server, in which the point-to-point connection supports encryption and encapsulation of data exchanged between the enterprise edge device and the computer server; when preparing to transmit data packets to the virtual machines on the computer server, configure each data packet to include a virtual machine network address for each virtual machine for which the data packet is destined and a physical network address of the computer server; and transmit the configured data packets using the established point-to-point connection to the computer server based on the included physical network address so that the computer server routes the configured data packets to each destined virtual machine based on the included virtual machine address.

In another example, the executed instructions further cause the enterprise edge device to transmit data packets to a gateway which routes data packets to respective computer servers, such that the enterprise edge device is simultaneously configured to transmit data packets to computer servers via direct tunneling using either the point-to-point connection or the gateway. In another example, the point-to-point connection is configured to dynamically connect to other computer servers. In another example, the computer server is an initial computer server, and the enterprise edge device removes the established point-to-point connection when the initial computer server goes stale and establishes a new point-to-point connection with a different computer server that is separate from the initial computer server. In another example, the executed instructions further cause the enterprise edge device to dynamically update the one or more hardware-based non-transitory memory devices to identify new virtual machines and deleted virtual machines on the computer server, such that the memory devices store network addresses for new virtual machines with which to communicate over point-to-point connections and delete from memory network addresses for deleted virtual machines. In another example, the executed instructions further cause the enterprise edge device to configure the data packets to comport with profile parameters for transmitting the data packets which are unique to the remote server, in which the profile parameters are re-usable and shareable for other remote servers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by an enterprise edge device to tunnel data packets in a cloud network from the enterprise edge device to a remote server, comprising:
   receiving, at the enterprise edge device, network address information for a plurality of virtual machines operating on a remote server in a virtual network;
   utilizing, by the enterprise edge device, a single tunnel between the enterprise edge device and each of the virtual machines operating on the remote server, in which the single tunnel is configured for transmitting information to each of the plurality of virtual machines operating on the remote server;
   determining, at the enterprise edge device, respective destination IP (Internet Protocol) addresses for each of the virtual machines in the plurality of virtual machines operating on the remote server using the received network address information; and
   transmitting, by the enterprise edge device utilizing the single tunnel, data packets to respective virtual machines operating on the remote server according to the respective destination IP addresses.

2. The method of claim 1, in which the single tunnel is a point-to-point connection between the enterprise edge device and the remote server and no other single tunnel is presently in operation between the enterprise edge device and the remote server during the transmission, in which the point-to-point connection supports encryption and encapsulation of data exchanged between the enterprise edge device and the remote server.

3. The method of claim 1, in which virtual machines on the remote server are associated with a single company entity.

4. The method of claim 3, in which the virtual machines for the single company entity form one set of virtual machines, and one or more remote servers further support multiple different sets of virtual machines that are respectively associated with different company entities.

5. The method of claim 1, in which the network address information includes a virtual IP address for each virtual machine and a physical IP address for the remote server, and the destination IP address is determined using both the virtual IP address and the physical IP address to transmit the data packets.

6. The method of claim 1, further including:
   receiving a profile for the remote server, the profile including a set of parameters by which to handle at least networking and data transmissions to the remote server from the enterprise edge device; and
   configuring the data packet according to the parameters included in the profile.

7. The method of claim 1, in which a destination IP address is determined when the enterprise edge device is preparing to transmit the data packets to a virtual machine.

8. One or more hardware-based non-transitory computer-readable memory devices storing instructions which, when executed by one or more processors disposed in an enterprise edge device associated with a cloud-service provider, cause the enterprise edge device to:
provide computing services to customer devices over a network, by which multiple virtual machines operate on a remote server to perform operations and functions, the enterprise edge device being in communication with the remote server;
create a first tunnel to the remote server, in which the first tunnel comprises a single tunnel between the enterprise edge device and each of the multiple virtual machines operating on the remote server, and in which the single tunnel is utilized to transmit data packets from the enterprise edge device to each of the multiple virtual machines operating on the remote server;
create a second tunnel to a gateway which is utilized to route data packets from the enterprise edge device to the virtual machines on the remote server; and
utilize the first and second tunnels to forward data packets to the virtual machines,
wherein the enterprise edge device is configured to transmit data packets to the virtual machines using data paths on the first and second tunnels.

9. The one or more hardware-based non-transitory computer-readable memory devices of claim 8, in which the one or more processors further cause the enterprise edge device to:
receive network address information for each virtual machine on the remote server;
attach a network address for a virtual machine to a data packet at least when using the first tunnel; and
use the attached network address information to forward the data packet to the virtual machine on the remote server for which the data packet is destined.

10. The one or more hardware-based non-transitory computer-readable memory devices of claim 9, in which the network address information includes virtual IP (Internet Protocol) address information for each virtual machine and physical IP address information for the remote server.

11. The one or more hardware-based non-transitory computer-readable memory devices of claim 8, in which the enterprise edge device is configured to selectively utilize the first and second tunnels per data transmission.

12. The one or more hardware-based non-transitory computer-readable memory devices of claim 11, in which the enterprise edge device utilizes the first tunnel to decrease latency in forwarding data packets to the virtual machines relative to the utilization of the second tunnel.

13. The one or more hardware-based non-transitory computer-readable memory devices of claim 8, in which the remote server is associated with a single customer, and further including a plurality of remote servers associated with the single customer, in which each of the plurality of remote servers has a tunnel which respectively provides a point-to-point connection between the enterprise edge device and a remote server among the plurality of remote servers.

14. The one or more hardware-based non-transitory computer-readable memory devices of claim 13, in which the first tunnel and the respective tunnels are each dynamically configured to be utilized with different remote servers when an original remote server goes stale.

15. An enterprise edge device configured to interact with computer servers in a virtualized network, comprising:
one or more processors; and
one or more hardware-based non-transitory memory devices storing computer-readable instructions which, when executed by the one or more processors cause the enterprise edge device to:
identify a network address for a computer server and virtual machines operating on the computer server;
using the network address, establish a point-to-point connection with the computer server utilizing a single tunnel, in which the point-to-point connection supports encryption and encapsulation of data exchanged between the enterprise edge device and each of the virtual machines operating on the computer server over the single tunnel;
while preparing to transmit data packets to the virtual machines operating on the computer server, configure each data packet to include a virtual machine network address for a virtual machine for which the data packet is destined and a physical network address of the computer server; and
transmit the configured data packets using the established point-to-point connection utilizing the single tunnel to the computer server based on the included physical network address so that the computer server routes the configured data packets to the destined virtual machine based on the included virtual machine network address.

16. The enterprise edge device of claim 15, in which the executed instructions further cause the enterprise edge device to transmit data packets to a gateway which routes data packets to respective computer servers, such that the enterprise edge device is simultaneously configured to transmit data packets to computer servers via direct tunneling using either the point-to-point connection or the gateway.

17. The enterprise edge device of claim 15, in which the point-to-point connection is configured to dynamically connect to other computer servers.

18. The enterprise edge device of claim 17, in which the computer server is an initial computer server, and the enterprise edge device removes the established point-to-point connection when the initial computer server goes stale and establishes a new point-to-point connection with a different computer server that is separate from the initial computer server.

19. The enterprise edge device of claim 15, in which the executed instructions further cause the enterprise edge device to dynamically update the one or more hardware-based non-transitory memory devices to identify new virtual machines and deleted virtual machines on the computer server, such that the memory devices store network addresses for new virtual machines with which to communicate over point-to-point connections and delete from memory network addresses for deleted virtual machines.

20. The enterprise edge device of claim 15, in which the executed instructions further cause the enterprise edge device to configure the data packets to comport with profile parameters for transmitting the data packets which are unique to the remote computer server, in which the profile parameters are re-usable and shareable for other remote computer servers.

* * * * *